US009360115B2

(12) United States Patent
Chaplin et al.

(10) Patent No.: US 9,360,115 B2
(45) Date of Patent: Jun. 7, 2016

(54) ROTARY SEAL WITH ANTI-SLIP ENERGIZING O-RING

(71) Applicants: Raymond Lee Chaplin, Draper, UT (US); Tiberio J. Gonzalez, Magna, UT (US); Tyler James Ryther, West Valley City, UT (US)

(72) Inventors: Raymond Lee Chaplin, Draper, UT (US); Tiberio J. Gonzalez, Magna, UT (US); Tyler James Ryther, West Valley City, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 143 days.

(21) Appl. No.: 14/064,627

(22) Filed: Oct. 28, 2013

(65) Prior Publication Data

US 2015/0115544 A1 Apr. 30, 2015

(51) Int. Cl.
*F16J 15/32* (2016.01)

(52) U.S. Cl.
CPC .......... *F16J 15/3208* (2013.01); *F16J 15/3268* (2013.01); *F16J 15/3216* (2013.01); *F16J 15/3248* (2013.01)

(58) Field of Classification Search
CPC ..... F16J 15/32; F16J 15/3216; F16J 15/3248; F16J 15/3268
See application file for complete search history.

(56) References Cited

U.S. PATENT DOCUMENTS

| 3,149,848 | A | * | 9/1964 | Galloway | 277/468 |
| 3,860,250 | A | * | 1/1975 | Lundquist | 277/589 |
| 3,945,650 | A | * | 3/1976 | Voitik | 277/556 |
| 4,151,999 | A | * | 5/1979 | Ringel et al. | 277/589 |
| 4,179,131 | A | * | 12/1979 | Nussbaumer | 277/468 |
| 5,018,753 | A | * | 5/1991 | Porel | 277/589 |
| 5,380,016 | A | * | 1/1995 | Reinsma et al. | 277/503 |
| 5,725,221 | A | * | 3/1998 | Pekarsky et al. | 277/589 |
| 6,105,970 | A | * | 8/2000 | Siegrist et al. | 277/458 |
| 6,217,029 | B1 | * | 4/2001 | Weiler | 277/434 |

* cited by examiner

*Primary Examiner* — Kristina Fulton
*Assistant Examiner* — Nicholas L Foster
(74) *Attorney, Agent, or Firm* — Mark Ussai; SKF USA Inc. Patent Dept.

(57) ABSTRACT

A seal assembly includes an annular static sealing member disposed within an annular channel in a housing or shaft. An annular dynamic sealing member is disposed coaxially within or about the static member and has a circumferential sealing surface engageable with the shaft or housing. An annular biasing member is disposed radially between the static and dynamic sealing members and is configured to bias the dynamic sealing member radially to maintain engagement of the sealing surface and the shaft or housing. The static member is configured to prevent relative angular displacement between the static and biasing members and the dynamic member is configured to prevent relative angular displacement between the dynamic and biasing members. As such, the dynamic sealing member, the biasing member and the static sealing member angularly displace within the channel as a single unit when torque above a particular magnitude is applied to the dynamic sealing member.

20 Claims, 9 Drawing Sheets

ROTARY SEAL WITH ANTI-SLIP ENERGIZING O-RING

BACKGROUND OF THE INVENTION

The present invention relates to seals, and more particularly to O-ring biased radial seals.

One type of seal for sealing radially, i.e., against an inner or outer circumferential surface, is referred to as an O-ring energized cap ring seal. Such a seal typically includes a generally rigid, annular sealing member or ring having a circumferential sealing surface which engages inwardly against a shaft ("inwardly-sealing") or outwardly against a bore ("outwardly-sealing"), the ring typically being formed of a relatively rigid polymer such as polytetrafluoroethylene ("PTFE"). An elastomeric ring (e.g., an O-ring) is disposed about or within the annular sealing member and pushes or biases the sealing member to maintain contact between the sealing surface and the shaft or bore.

When the sealing member is subjected to a torque sufficient to overcome static friction between the biasing member and the sealing member, the sealing member angularly displaces relative to the biasing member and slides against the biasing member surface in contact with the sealing member. Such sliding movement may abrade or otherwise damage the biasing member, which may ultimately result in failure of the seal.

SUMMARY OF THE INVENTION

In one aspect, the present invention is a seal assembly for sealing a space between a housing with a central bore and a rotatable shaft disposed within the bore, one of the housing and the shaft having an annular channel defined by a circumferential surface and first and second facing radial surfaces. The seal assembly basically comprises a generally annular static sealing member disposed within the annular channel and having a central axis. A generally annular dynamic sealing member is disposed at least partially within the channel and either coaxially within the static sealing member or coaxially about the static sealing member, the dynamic sealing member having a circumferential sealing surface sealingly engageable with one of the shaft and the housing. Further, a generally annular biasing member disposed radially between the static and dynamic sealing members and configured to bias the dynamic sealing member radially to maintain engagement of the sealing surface and the one of the shaft and the housing. The static sealing member is configured to prevent relative angular displacement between the static member and the biasing member and the dynamic sealing member is configured to prevent relative angular displacement between the dynamic member and the biasing member. As such, the dynamic sealing member, the biasing member and the static sealing member angularly displace within the channel generally as a single unit when torque of at least a particular magnitude is applied to the dynamic sealing member.

In another aspect, the present invention is again a seal assembly for sealing a space between a housing with a central bore and a rotatable shaft disposed within the bore, one of the housing and the shaft having an annular channel defined by a circumferential surface and first and second facing radial surfaces. The seal assembly comprises a generally annular static sealing member disposed within the annular channel and having inner and outer circumferential surfaces, one of the inner and outer surfaces being disposed against the channel circumferential surface and the other one of the inner and outer circumferential surfaces being a contact surface. The static member has at least a plurality of recesses extending inwardly from a remainder of the contact surface and/or a plurality of projections extending outwardly from a remainder of the contact surface. A generally annular dynamic sealing member is disposed at least partially within the channel and either coaxially within the static sealing member or coaxially about the static sealing member. The dynamic sealing member has a circumferential sealing surface sealingly engageable with one of the shaft and the housing and an opposing circumferential contact surface, the contact surface facing generally toward the static member contact surface. The dynamic member has a plurality of recesses extending inwardly from a remainder of the contact surface and/or a plurality of projections extending outwardly from a remainder of the contact surface. Further, a generally annular biasing member is disposed radially between the static member contact surface and the dynamic member contact surface and is configured to bias the dynamic sealing member generally radially so as to maintain engagement of the sealing surface and the one of the shaft and the housing.

In a further aspect, the present invention is once again a seal assembly for sealing a space between a housing with a central bore and a rotatable shaft disposed within the bore, one of the housing and the shaft having an annular channel defined by a circumferential surface and first and second facing radial surfaces. The seal assembly comprises a generally annular static sealing member disposed within the annular channel, having a central axis and being formed of a material including polytetrafluoroethylene. A generally annular dynamic sealing member is disposed at least partially within the channel and one of coaxially within the static sealing member and coaxially about the static sealing member, the dynamic sealing member having a circumferential sealing surface sealingly engageable with one of the shaft and the housing and is formed of a material including polytetrafluoroethylene. A generally annular biasing member is disposed radially between the static and dynamic sealing members, is configured to bias the dynamic sealing member radially to maintain engagement of the sealing surface and the one of the shaft and the housing, and is formed of an elastomeric material.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-10 a seal assembly 10 for sealing a spaces S between a housing 1 with a central bore 3 and a rotatable shaft 2 disposed within the bore 3. Either the housing 1 or the shaft 2 has an annular channel 4 defined by a circumferential surface 5 and first and second facing radial surfaces 6. The seal assembly 10 basically comprises a generally annular static sealing member 12, a generally annular dynamic sealing member 14 and a generally annular biasing member 16. The static sealing member 12 is disposed within the annular channel 4 and has a central axis 11. The dynamic sealing member 14 is disposed partially within the channel 4 and either coaxially within, or coaxially about, the static sealing member 14 and has a circumferential sealing surface 18 sealingly engageable with either the shaft 2 or the housing 1, i.e., the component not providing the channel 4. Further, the biasing member 16 is disposed radially between the static and dynamic sealing members 12, 14 and is configured to bias the dynamic sealing member 14 radially to maintain engagement of the sealing surface 18 and the one of the shaft 2 and the housing 1.

Figure 1:
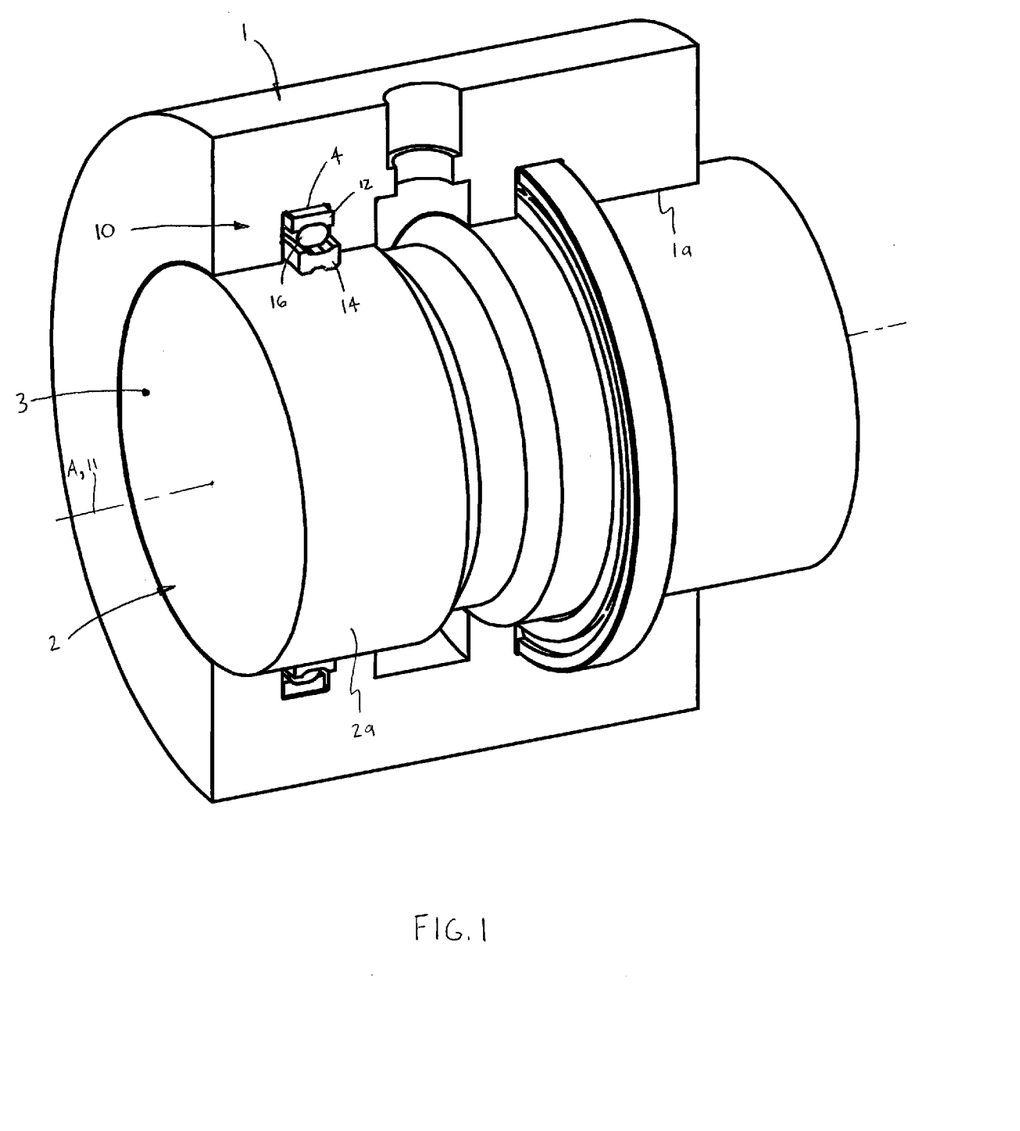
FIG. 1 is an axial cross-sectional view in perspective of a seal assembly of the present invention, shown in an inwardly-sealing application installed within a housing channel and sealing against a rotary shaft.
Figure 2:
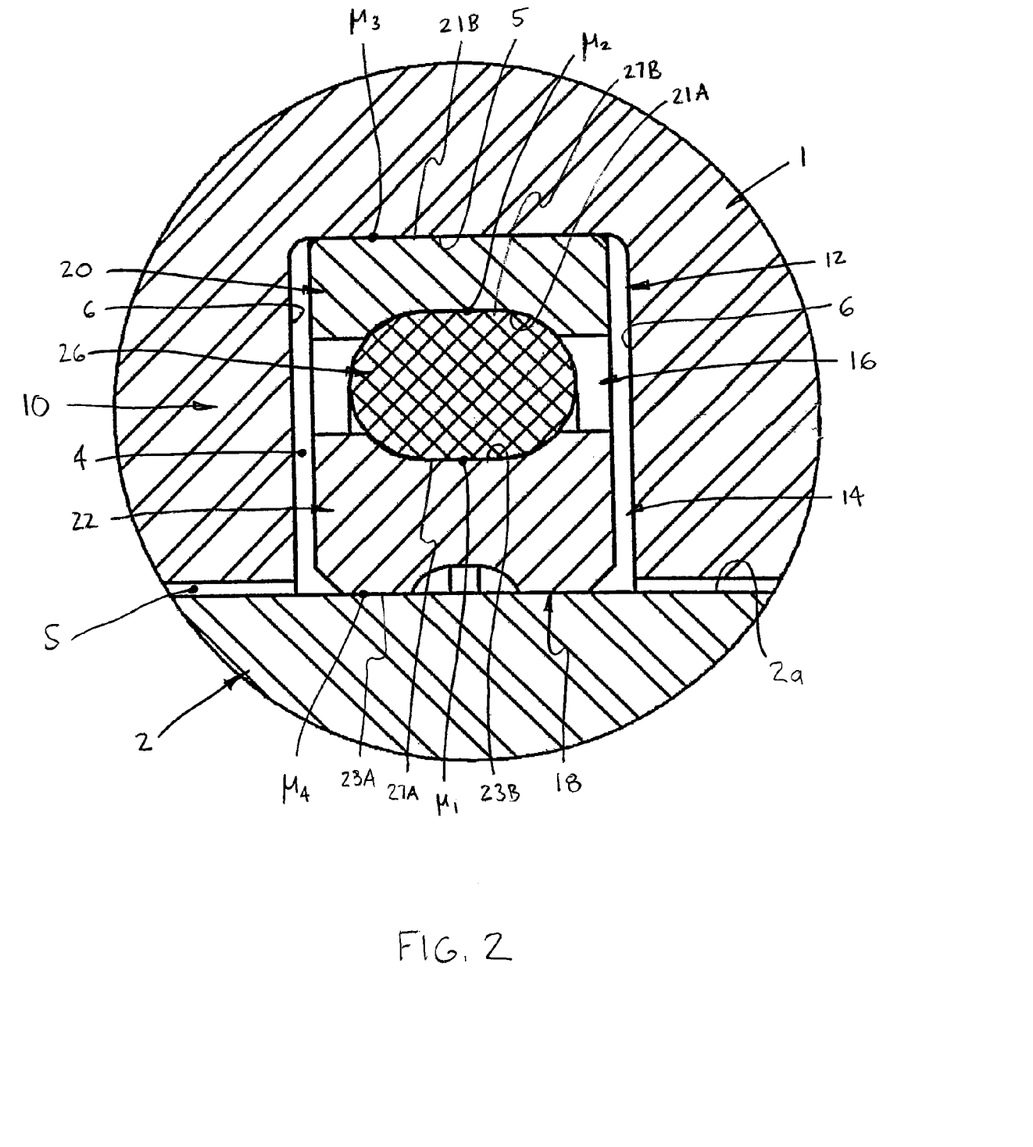
FIG. 2 is an enlarged, axial cross-sectional view of the seal assembly of FIG. 1.
Figure 3:
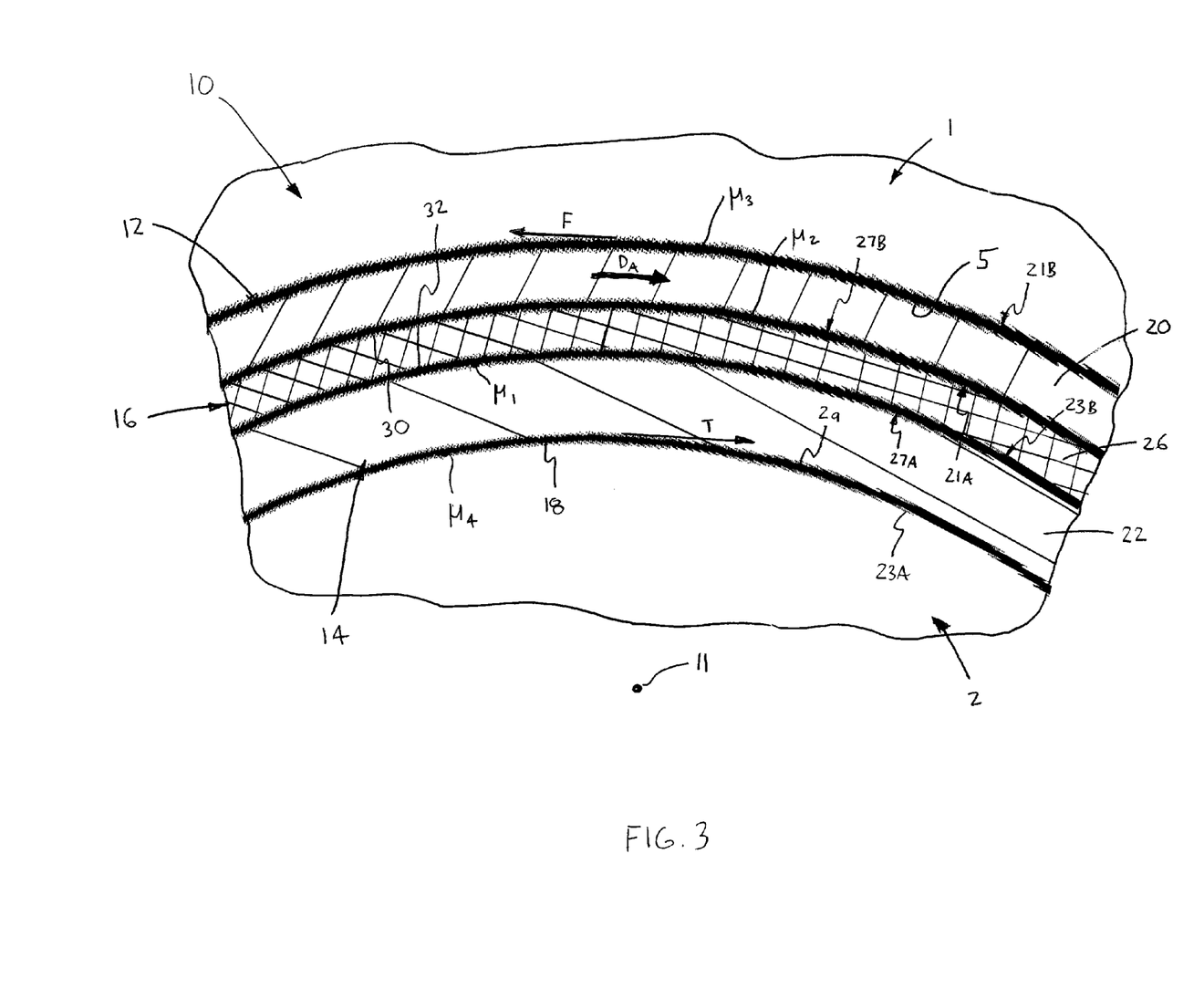
FIG. 3 is a broken-away, radial cross-sectional view of the seal assembly, taken through line 3-3 of FIG. 2.

The static sealing member 12 is configured to prevent relative angular displacement between the static member 12 and the biasing member 16, while the dynamic sealing member 14 is also configured to prevent relative angular displacement between the dynamic member 14 and the biasing member 16. As such, the dynamic sealing member 14, the biasing member 16 and the static sealing member 12 angularly displace within the channel 4 generally as a single unit when torque of at least a particular magnitude is applied to the dynamic sealing member 14. In other words, torque T applied to the dynamic sealing member 14 will be initially resisted by friction force F resulting at the interface between the static sealing member 12 and the channel surface 5, as best shown in FIG. 3. If the torque T is greater than the maximum static friction F between the static member 12 and the channel surface 5, the entire seal assembly 10 angularly displaces or slides together (i.e., without relative displacement) within the channel 4 as indicated by the arrow $D_A$ in FIG. 3, although such angular displacement is generally only a few degrees. Thus, in the present sealing assembly 10, there is substantially no relative displacement between the dynamic sealing member 14 and the biasing member 16, or between the biasing member 16 and the static member 12, which could lead to abrasion or tearing (and ultimate failure) of the biasing member 16 and seal assembly 10.

Preferably, the static sealing member 12 includes a substantially circular, cylindrical ring 20 having inner and outer circumferential surfaces 21A, 21B and formed of a generally rigid polymeric material. Similarly, the dynamic sealing member 14 also preferably includes a substantially circular, cylindrical ring 22 having inner and outer circumferential surfaces 23A, 23B and formed of a generally rigid polymeric material. If the seal assembly 10 is inwardly-sealing, the channel 4 is formed in the housing 1 and the dynamic sealing ring is sized with an outside diameter $OD_D$ (FIG. 7) lesser than the inside diameter $ID_S$ (FIG. 7) of the static sealing member 12 and is disposed coaxially within the static member 12, as shown in FIGS. 1-9. Alternatively, if the seal assembly 10 is outwardly-sealing, the channel 4 is formed in the shaft 2 and the dynamic sealing member 14 is sized having an inside diameter $ID_D$ greater than the outside diameter $OD_S$ of the static sealing member 12 and is disposed coaxially about the static member 12, as indicated in FIG. 10.

Figure 4:
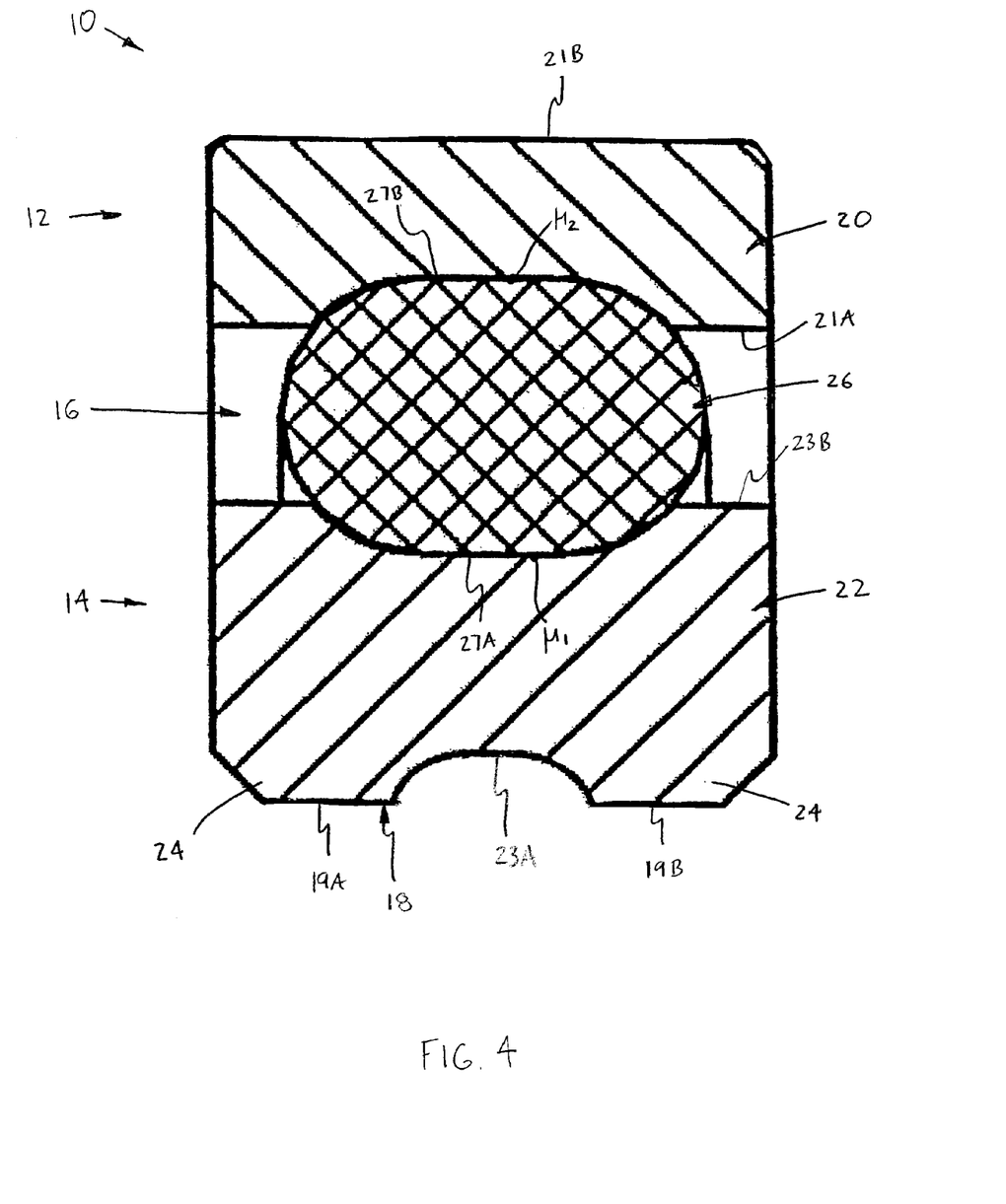
FIG. 4 is a more enlarged axial cross-sectional view of the seal assembly; shown separate from the housing and shaft.
Figure 5:
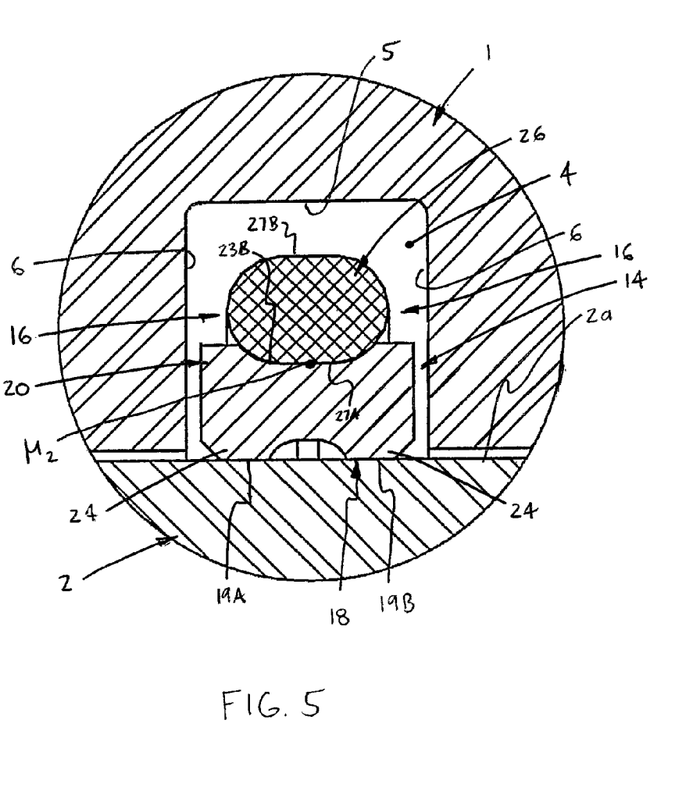
FIG. 5 is an axial cross-sectional view of a dynamic sealing member and a biasing member installed within a housing channel.
Figure 6:
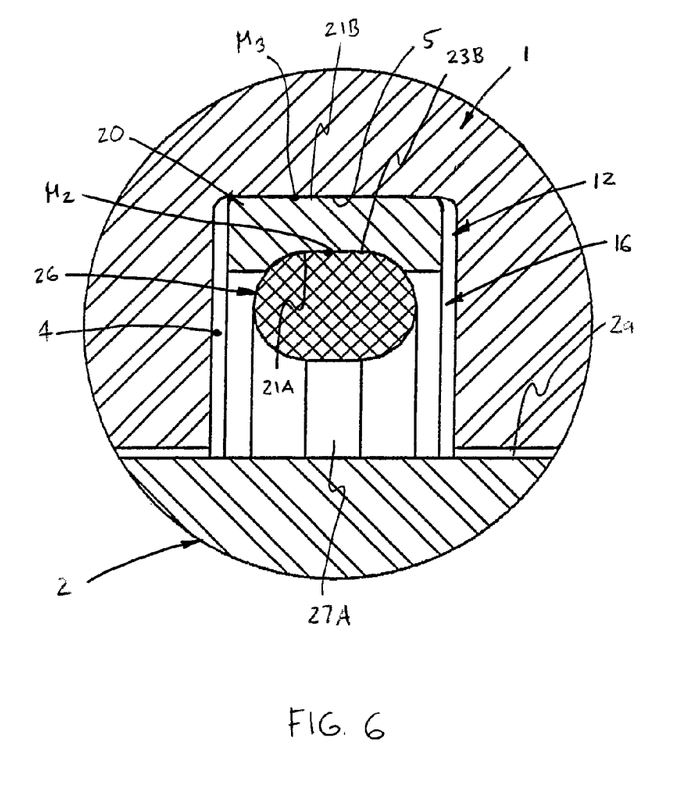
FIG. 6 is an axial cross-sectional view of a static sealing member and the biasing member installed within a housing channel.

In either case, the dynamic sealing member 14 preferably includes at least two axially-spaced, generally annular projections 24 extending radially from one of the dynamic sealing member inner and outer surfaces 23A, 23B, each one of the two projections 24 providing a separate circumferential sealing surface section 19A, 19B, as best shown in FIG. 4. Further, the biasing member 16 preferably includes a substantially circular ring or "donut" 26 having generally elliptical axial cross-sections and inner and outer circumferential surfaces 27A, 27B. The biasing member 16 is sized so as to be compressed or "sandwiched" between the two sealing members 12, 14. As such, the biasing member 16 is thereby configured to bias the static sealing member 12 generally radially toward the channel surface 4 and to simultaneously bias the dynamic sealing member 14 generally toward the shaft 2 or the housing 1. Preferably, the biasing member 16 is formed generally as an "O-ring" of an elastomeric material, such as natural or synthetic rubber.

With the above structure, one of the biasing member inner and outer surfaces 27A, 27B and one of the dynamic sealing member inner and outer surfaces 23A, 23B contact each other and have a first coefficient of friction $\mu_1$. The other one of the biasing member inner and outer surfaces 27A, 27B and one of the static sealing member inner and outer surfaces 21A, 21B contact each other and have a second coefficient of friction $\mu_2$. Further, the other one of the static member inner and outer surfaces 21A, 21B and the channel circumferential surface 5 contact each other and have a third coefficient of friction $\mu_3$. Through appropriate selection of materials and treatment of the contact surfaces, as described below, the third coefficient of friction $\mu_3$ is lesser than each one of the first and second coefficients of friction $\mu_1$, $\mu_2$. As such, static friction at the interface between the static sealing member 12 and the channel surface 5 is lesser than the friction at the interfaces of the static member 12 and the biasing member 16 and of the biasing member 16 and the dynamic sealing member 14. Therefore, torque T applied to the dynamic sealing member 16 that is above the maximum static friction F at the static sealing member/channel surface interface angularly displaces the entire seal assembly 10 relative to the channel 4, thereby protecting the biasing member 16 as discussed above.

Further, the dynamic sealing member 14 and either the shaft 2 or the housing 1, depending on whether the seal assembly 10 is inward-sealing or outward-sealing, respectively, contact each other and have a fourth coefficient of friction $\mu_4$. Typically, both the shaft 2 and the housing 1 are formed of a metallic material, such as steel, aluminum, etc, and may be formed of the same or different materials. Regardless of the particular housing or shaft material, the static sealing member 12 and the dynamic sealing member 14 are either fabricated of different polymeric materials and/or formed or treated such that the third coefficient $\mu_3$ of friction is greater than the fourth coefficient of friction $\mu_4$. As such, the sealing surface 18 of the dynamic sealing member 14 is capable of sliding against the shaft 2 or housing 1 while the static sealing member 12 remains generally stationary within the channel/groove 4, except when torque above a particular threshold or magnitude is applied to the dynamic sealing member 14 as discussed above. The following combinations of materials for the static and dynamic sealing members 12, 14 provide this functionality: static sealing member 12—bronze filled polytetrafluoroethylene ("PTFE"), dynamic sealing member 14—graphite filled PTFE; static member 12—60% bronze PTFE, dynamic member 14—40% PTFE; and static member 12—heavy bronze filled PTFE, dynamic member 14—glass molybdenum disulfide ("moly") filled PTFE.

Figure 7:
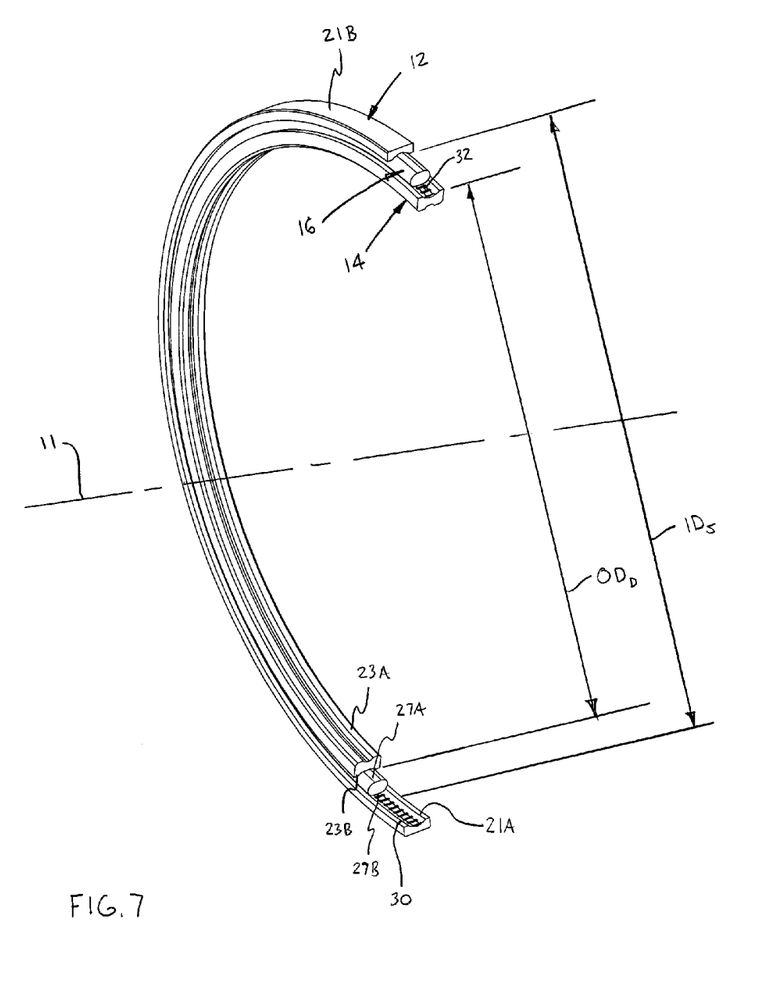
FIG. 7 is a broken-away, perspective view of the seal assembly.
Figure 8:
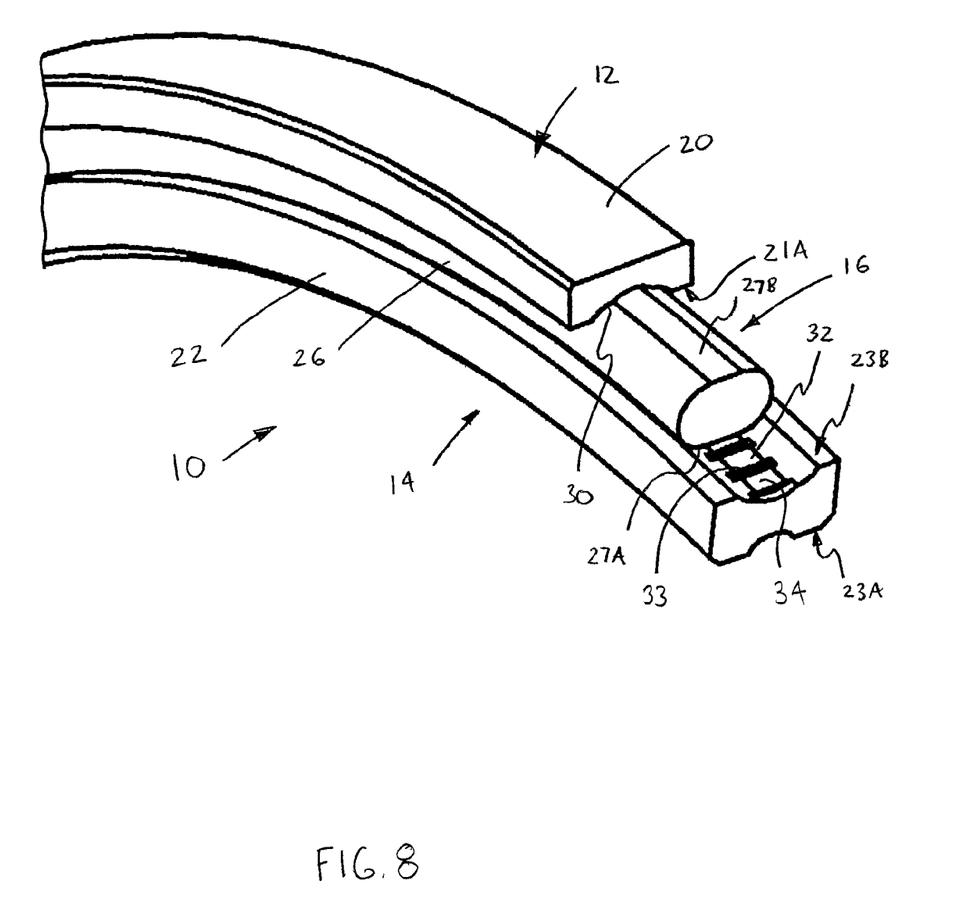
FIG. 8 is an enlarged view of an upper portion of FIG. 7, showing projections and recesses on a contact surface of the dynamic sealing member.
Figure 9:
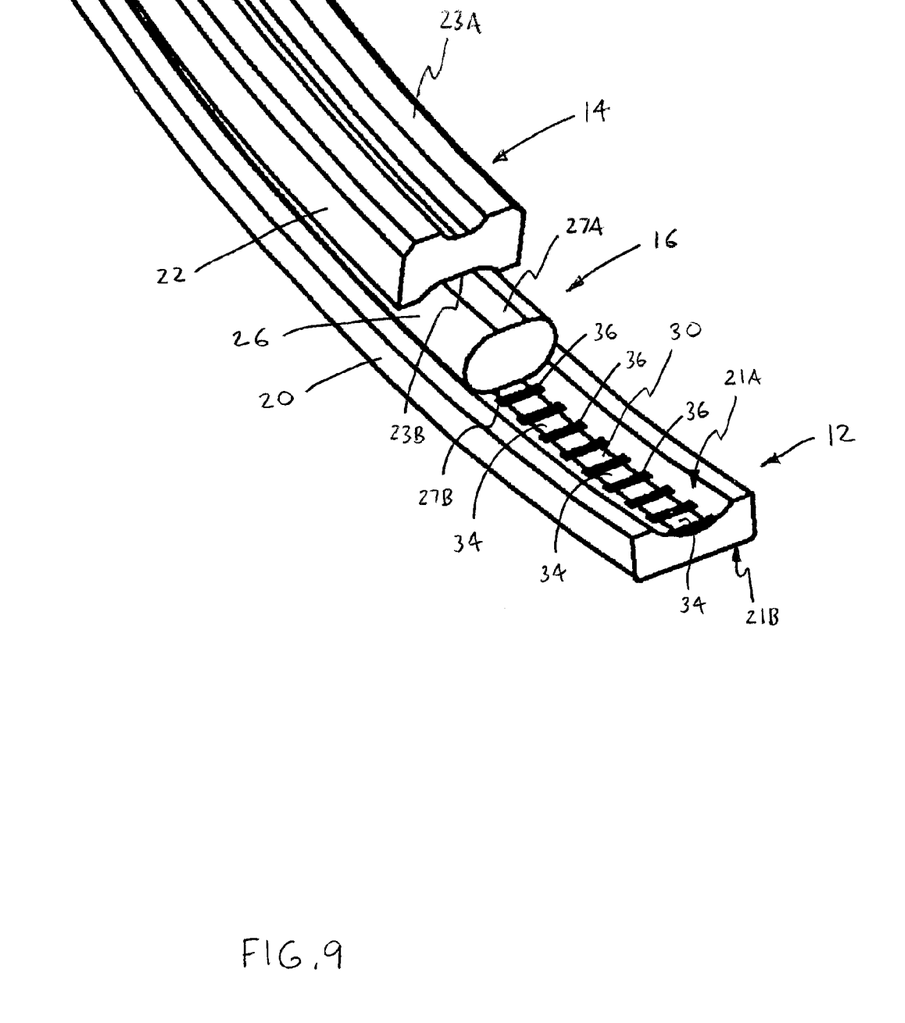
FIG. 9 is an enlarged view of a lower portion of FIG. 7, showing projections and recesses on a contact surface of the static sealing member.
Figure 10:
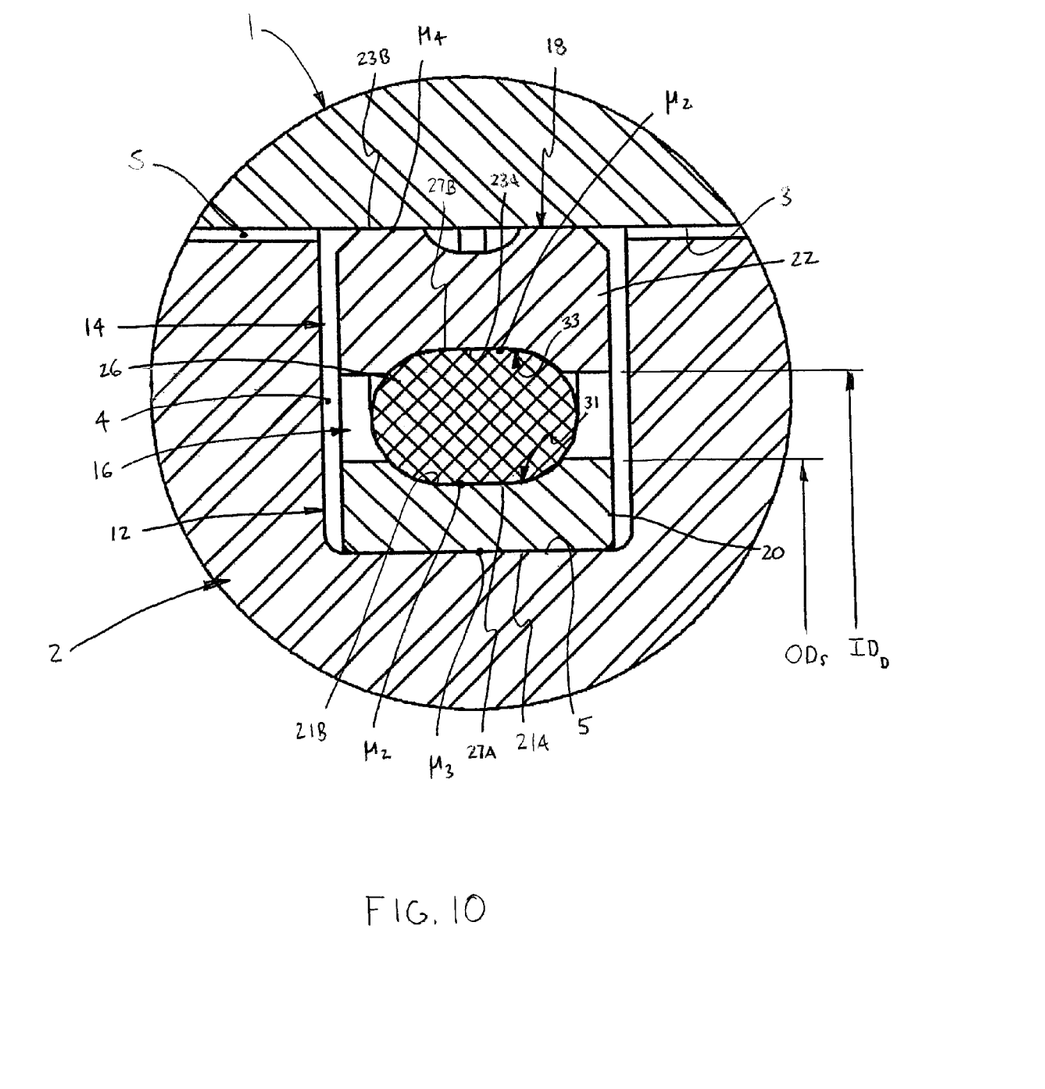
FIG. 10 is an axial cross-sectional view of the seal assembly, shown in an outwardly-sealing application installed within a shaft channel and sealing against a housing.

Referring now to FIGS. 7-10, with an inward-sealing seal assembly 10, the inner circumferential surface 21A of the static sealing member 12 provides a contact surface 30 juxtaposed with the biasing member outer circumferential surface 27B and the outer circumferential surface 23B of the dynamic sealing member 14 provides a contact surface 32 juxtaposed with the biasing member inner surface 27A, as shown in FIGS. 7-9. Alternatively, with an outward-sealing seal assembly 10, the outer circumferential surface 21B of the static sealing member 12 provides a contact surface 31 juxtaposed with the biasing member inner circumferential surface 27A and the inner circumferential surface 23A of the dynamic sealing member 14 provides a contact surface 33 juxtaposed with the biasing member outer circumferential surface 27B, as indicated in FIG. 10.

In either case, the static sealing member 12 and the dynamic sealing member 14 each preferably include a plurality of recesses 34 extending inwardly from a remainder of the contact surface 30/32 or 31/33 and/or a plurality of projections 36 extending outwardly from a remainder of the contact surface 30/32 or 31/33. That is, each one of the sealing members 12, 14 is fabricated, or each contact surface 30/32 or 31/33 is machined, processed or "treated" after forming the sealing members 12, 14, such that the plurality of recesses 34 and projections 36 are provided. As such, the first and second coefficients of friction $\mu_1$, $\mu_2$ are increased, in comparison with "smooth" contact surfaces (not shown) against the biasing member 16, to ensure that the third coefficient of friction $\mu_3$ between the static member 12 and the channel surface 5 is lesser than each of the first and second coefficients of friction $\mu_1$, $\mu_2$. The recesses 34 and/or projections 36 may be formed in each contact surface 30/32 or 31/33 by any one of various treatment processes to increase surface roughness and gripping, including molding, etching, cutting, knurling or any other appropriate fabricating, machining, or material treatment technique that creates sections of varying depth on the surfaces 30/32 or 31/33 so as to increase surface roughness.

Alternatively, a contact surface 30 or 31 of the static sealing member 12 and a contact surface 32 or 33 of the dynamic sealing member 14 may be chemically transformed or "etched" with a chemical, such as for example, sodium naphthalene, to increase the coefficient of friction $\mu_1$, $\mu_2$ between the contact surfaces 30/32 or 31/33 and the circumferential surfaces 27A, 27B of the biasing member 16. Such an etching process removes fluorine atoms from carbon/fluorine molecules, so that each contact surface 30/32 or 31/33 is essentially comprised of carbon atoms, which results in an increase in the adhesiveness of the contact surfaces.

It will be appreciated by those skilled in the art that changes could be made to the embodiments described above without departing from the broad inventive concept thereof. For example, the seal assembly 10 may be used with a housing 1 that is rotatable about a fixed central shaft 2, and be constructed in a similar or identical manner as described herein. It is understood, therefore, that this invention is not limited to the particular embodiments disclosed, but it is intended to cover modifications within the spirit and scope of the present invention as generally defined in the appended claims.

We claim:

1. An apparatus having a seal assembly, the apparatus comprising:
 a housing with a central bore;
 a shaft being rotatable and disposed within the central bore, one of the housing and the central bore having an annular channel defined by a circumferential surface and first and second facing radial surfaces, the seal assembly for sealing a space between the housing and the rotatable shaft further comprising:
 a static sealing member being generally annular and disposed within the annular channel and having a central axis;
 a dynamic sealing member being generally annular and disposed at least partially within the channel and one of coaxially within the static sealing member and coaxially about the static sealing member, the dynamic sealing member having a circumferential sealing surface sealingly engageable with one of the shaft and the housing; and
 a biasing member being generally annular and disposed radially between the static and dynamic sealing members and configured to bias the dynamic sealing member radially to maintain engagement of the sealing surface and the one of the shaft and the housing, wherein the static sealing member, the dynamic sealing member, and the biasing member are each separate, non-bonded together components that angularly rotate together due to at least one of frictional forces therebetween and surface roughness, the static sealing member being configured to prevent relative angular displacement between the static member and the biasing member and the dynamic sealing member being configured to prevent relative angular displacement between the dynamic sealing member and the biasing member such that the dynamic sealing member, the biasing member and the static sealing member angularly displace within the channel generally as a single unit when torque of at least a particular magnitude is applied to the dynamic sealing member.

2. The apparatus as recited in claim 1 wherein each one of the two sealing members and the biasing member has inner and outer circumferential surfaces, one of the biasing member inner and outer surfaces and one of the dynamic sealing member inner and outer surfaces contact each other and have a first coefficient of friction, the other one of the biasing member inner and outer surfaces and one of the static sealing member inner and outer surfaces contact each other and have a second coefficient of friction, and the other one of the static member inner and outer surfaces and the circumferential surface of the channel contact each other and have a third coefficient of friction, the third coefficient of friction being lesser than each one of the first and second coefficients of friction.

3. The apparatus as recited in claim 2 wherein the dynamic sealing member and the one of the shaft and the housing contact each other and have a fourth coefficient of friction, the biasing member is formed of an elastomeric material, the static sealing member is formed of a first polymeric material and the dynamic sealing member is formed of a second polymeric material, the first and second polymeric materials being selected such that the third coefficient of friction is greater than the fourth coefficient of friction.

4. The apparatus as recited in claim 1 wherein the biasing member has inner and outer circumferential surfaces and each one of the two sealing members has a circumferential contact surface juxtaposed with a separate one of the biasing member inner and outer surfaces and at least one of a plurality of recesses extending inwardly from a remainder of the contact surface and a plurality of projections extending outwardly from a remainder of the contact surface.

5. The apparatus as recited in claim 4 wherein the at least one of the recesses and the projections is formed in the contact surface by a process including one of molding, cutting and knurling.

6. The apparatus as recited in claim 1 wherein the biasing member has inner and outer circumferential surfaces and each one of the two sealing members has a circumferential contact surface juxtaposed with a separate one of the biasing member inner and outer surfaces, each one of the static member contact surface and the dynamic member contact surface being chemically etched.

7. The apparatus as recited in claim 1 wherein the biasing member is formed of an elastomeric material and each one of the two sealing members is formed of a generally rigid polymeric material.

8. The apparatus as recited in claim 1 wherein the biasing member is configured to bias the static sealing member generally radially toward the channel surface and to bias the dynamic sealing member generally toward the one of the shaft and the housing.

9. The apparatus as recited in claim 1 wherein the dynamic sealing member includes at least two axially-spaced, generally annular projections extending radially from one of the dynamic sealing member inner and outer surfaces, each one of the two projections providing a separate circumferential sealing surface section.

10. An apparatus having a seal assembly, the apparatus comprising:
a housing with a central bore;
a shaft being rotatable and disposed within the central bore, one of the housing and the central bore having an annular channel defined by a circumferential surface and first and second facing radial surfaces, the seal assembly for sealing a space between the housing and the rotatable shaft further comprising:
a static sealing member being generally annular and disposed within the annular channel and having inner and outer circumferential surfaces, one of the inner and outer surfaces being disposed against the channel circumferential surface and the other one of the inner and outer circumferential surfaces being a contact surface, the static sealing member having at least one of a plurality of recesses extending inwardly from a remainder of the contact surface and a plurality of projections extending outwardly from a remainder of the contact surface;
a dynamic sealing member being generally annular and disposed at least partially within the channel and one of coaxially within the static sealing member and coaxially about the static sealing member, the dynamic sealing member having a circumferential sealing surface sealingly engageable with one of the shaft and the housing and an opposing circumferential contact surface, the contact surface facing generally toward the static member contact surface, the dynamic member having least one of a plurality of recesses extending inwardly from a remainder of the contact surface and a plurality of projections extending outwardly from a remainder of the contact surface; and
a biasing member being generally annular and disposed radially between the static member contact surface and the dynamic member contact surface and configured to bias the dynamic sealing member generally radially so as to maintain engagement of the sealing surface and the one of the shaft and the housing, wherein the static sealing member, the dynamic sealing member, and the biasing member are each separate, non-bonded together components that angularly rotate together due to at least one of frictional forces therebetween and surface roughness.

11. The apparatus as recited in claim 10 wherein the at least one of the projections and recesses of the static sealing member are configured to prevent relative angular displacement between the static sealing member and the biasing member and the at least one of the projections and recesses of the dynamic sealing member are configured to prevent relative angular displacement between the dynamic sealing member and the biasing member such that the dynamic sealing member, the biasing member and the static sealing member are angularly displaceable within the channel generally as a single unit when torque of at least a particular magnitude is applied to the dynamic sealing member.

12. The apparatus as recited in claim 10 wherein one of the biasing member inner and outer surfaces and the dynamic sealing member contact surface contact each other and have a first coefficient of friction, the other one of the biasing member inner and outer surfaces and the static sealing member contact surface contact each other and have a second coefficient of friction, and the other one of the static sealing member inner and outer surfaces and the channel surface contact each other and have a third coefficient of friction, the third coefficient of friction being lesser than each one of the first and second coefficients of friction.

13. The apparatus as recited in claim 12 wherein the dynamic sealing member and the one of the shaft and the housing contact each other and have a fourth coefficient of friction, the biasing member is formed of an elastomeric material, the static sealing member is formed of a first polymeric material and the dynamic sealing member is formed of a second polymeric material, the first and second polymeric materials being selected such that the third coefficient of friction is greater than the fourth coefficient of friction.

14. The apparatus as recited in claim 10 wherein the at least one of the recesses and the projections is formed in the contact surface by a process including one of molding, cutting and knurling.

15. The apparatus as recited in claim 10 wherein the biasing member is formed of an elastomeric material and each one of the two sealing members is formed of a generally rigid polymeric material.

16. An apparatus having a seal assembly, the apparatus comprising:
   a housing with a central bore;
   a shaft being rotatable and disposed within the central bore, one of the housing and the central bore having an annular channel defined by a circumferential surface and first and second facing radial surfaces, the seal assembly for sealing a space between the housing and the rotatable shaft further comprising:
      a static sealing member being generally annular and disposed within the annular channel, having a central axis and being formed of a material including polytetrafluoroethylene;
      a dynamic sealing member being generally annular and disposed at least partially within the channel and one of coaxially within the static sealing member and coaxially about the static sealing member, the dynamic sealing member having a circumferential sealing surface sealingly engageable with one of the shaft and the housing and being formed of a material including polytetrafluoroethylene; and
      a biasing member being generally annular and disposed between the static and dynamic sealing members, configured to bias the dynamic sealing member radially to maintain engagement of the sealing surface and the one of the shaft and the housing, and being formed of an elastomeric material, wherein the static sealing member, the dynamic sealing member, and the biasing member are each separate, non-bonded together components that angularly rotate together due to at least one of frictional forces therebetween and surface roughness.

17. The apparatus as recited in claim 16 wherein the static sealing member is configured to prevent relative angular displacement between the static sealing member and the biasing member and the dynamic sealing member is configured to prevent relative angular displacement between the dynamic sealing member and the biasing member such that the dynamic sealing member, the biasing member and the static sealing member angularly displace within the channel generally as a single unit when torque of at least a particular magnitude is applied to the dynamic sealing member.

18. The apparatus as recited in claim 16 wherein each one of the two sealing members and the biasing member has inner and outer circumferential surfaces, one of the biasing member inner and outer surfaces and one of the dynamic sealing member inner and outer surfaces contact each other and have a first coefficient of friction, the other one of the biasing member inner and outer surfaces and one of the static sealing member inner and outer surfaces contact each other and have a second coefficient of friction, and the other one of the static sealing member inner and outer surfaces and the channel circumferential surface contact each other and have a third coefficient of friction, the third coefficient of friction being lesser than each one of the first and second coefficients of friction.

19. The apparatus as recited in claim 18 wherein the dynamic sealing member and the one of the shaft and the housing contact each other and have a fourth coefficient of friction, the biasing member is formed of an elastomeric material, the static sealing member is formed of a first polymeric material and the dynamic sealing member is formed of a second polymeric material, the first and second polymeric materials being selected such that the third coefficient of friction is greater than the fourth coefficient of friction.

20. The apparatus as recited in claim 16 wherein the biasing member has inner and outer circumferential surfaces, each one of the static sealing member and the dynamic sealing member has a circumferential contact surface juxtaposed with a separate one of the biasing member inner and outer surfaces, and wherein one of:
   each one of the static member contact surface and the dynamic member contact surface has plurality of recesses and a plurality of projections; and
   each one of the static member contact surface and the dynamic member contact surface is chemically etched.

* * * * *